3,536,640
METHYLOL PHENOL ETHER MODIFIED ALKYD-
AMINE RESIN COATING COMPOSITIONS
Erwin J. Kapalko and Richard A. Martin, Delaware,
Ohio, assignors to PPG Industries, Inc., a corporation
of Pennsylvania
No Drawing. Filed Oct. 24, 1967, Ser. No. 677,718
Int. Cl. C09d 3/52, 3/66
U.S. Cl. 260—21                                9 Claims

ABSTRACT OF THE DISCLOSURE

Coating compositions having outstanding hardness, durability, detergent resistance, and other improved properties are provided by a combination of an alkyd resin-aminoplast resin composition and a methylol phenol ether composition of the formula

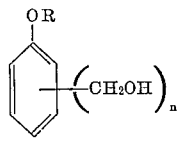

where $n$ is 1 to 3 and R is an unsaturated aliphatic group or a halogenated derivative of such a group. The alkyd resin is either oil-modified or oil-free, and benzoguanamine-formaldehyde resins are preferred but melamine and urea resins are also useful. The properties of these coating compositions make them highly useful on appliances such as laundry equipment, particularly as primers.

---

Coating compositions based upon a combination of an alkyd resin and an aminoplast resin are well known and have been widely used to provide hard and attractive coatings on various articles, such as appliances, automobiles, and the like. Being based upon a combination of two different resinous materials, they achieve properties which cannot be attained using either component alone. For this same reason, however, certain of the less desirable properties of the individual components are found in compositions based upon their blends.

However, although coatings based upon such alkyd-aminoplast compositions have overall properties which make them desirable for many applications, for some uses they have certain disadvantages. One especially troublesome property is detergent resistance, which means the ability to withstand hot solutions of detergents without degrading the coating or the substrate. Detergent resistance is an extremely important property in any coating which is to be used on laundry equipment or other appliances.

It has now been found that coating compositions having an unexpectedly good combination of properties, including outstanding detergent resistance, are obtained by combining the aforesaid alkyd-aminoplast compositions with a composition consisting essentially of one or more methylol phenol ethers. Such coating compositions provide numerous advantages, including, as mentioned, exceptional detergent resistance, as well as improved adhesion to many substrates and better salt-spray resistance. Most significantly, these advantages are obtained without detracting from other properties. The excellent properties of the coating compositions herein make them especially useful as primers and other coatings for washers, dyers and similar appliances in which such properties are necessary.

The alkyd resin-aminoplast resin compositions to which the instant invention is applicable include those containing various aldehyde condensation products of melamine, urea, benzoguanamine and similar amino compounds. Generally, the aminoplast resin forms from about 5 percent to about 60 percent of the total weight of the alkyd and aminoplast resin.

Aminoplast resins produced from melamine, urea and benzoguanamine are most common and are preferred. However, condensation products of other amines and amides can also be employed, for example, those of triazines, diazines, triazoles, guanidines, guanamines, alkyl and aryl substituted derivatives of such compounds, including alkyl and aryl substituted ureas, and alkyl and aryl substituted melamines, provided at least one amino group is present. Some examples of such compounds are N,N'-dimethylurea, benzyl urea, dicyandiamide, formoguanamine, acetoguanamine, ammeline, 2-chloro-4,6-diamino-1,3,5 - triazine, 6 - methyl-2,4-diamino-1,3,5-triazine, 2 - phenyl -4 amino-6-hydroxy-1,3,5-triazine, 3,5-diaminotriazole, triaminopyrimidine, 2 - mercapto - 4,6-diaminopyrimidine, 2,4,6 - trihydrazine - 1,3,5-triazine, 2,4,6 - trimethyltriamino - 1,3,5 - triazine, 2,4,6-triphenyltriamino - 1,3,5 - triazine, and the like. Benzoguanamine-formaldehyde resins are generally preferred because they are more soluble in the solvents best employed in many commercial coating operations, and because the resultant coatings have an especially desirable combination of properties.

The aldehyde used in making the aminoplast is usually formaldehyde, although similar condensation products can be made from other aldehydes, such as acetaldehyde, crotonaldehyde, acrolein, benzaldehyde, furfural, and others.

These aldehyde condensation products contain methylol or similar alkylol groups, the structure of the alkylol group depending upon the particular aldehyde employed. At least a portion of these alkylol groups are preferably etherified by reaction with an alcohol to provide resins which are soluble in the desired solvent. Any monohydric alcohol can be employed for this purpose, including such alcohols as methanol, ethanol, propanol, butanol, pentanol, hexanol, heptanol, and other alkanols, usually having up to about 12 carbon atoms; as well as benzyl alcohol and other aromatic alcohols; cyclic alcohols, such as cyclohexanol; monoethers of glycols, such as the Cellosolves and Carbitols; and halogen-substituted or other substituted alcohols, such as 3-chloropropanol. Butanol and methanol are preferred etherifying alcohols.

The amine-aldehyde resin is produced in a manner well known in the art, using acidic or basic catalysts and varying conditions of time and temperature in accordance with conventional practice. The formaldehyde is often employed as a solution in water or alcohol, and the condensation, etherification and polymerization reactions may be carried out either sequentially or simultaneously.

Unmodified alkyd resins made from saturated polyols and acids, i.e. oil-free saturated polyesters, are in certain cases preferred in formulating the compositions of the invention, but in other cases oil-modified alkyds are preferably utilized. In general, there may be employed any of the saturated or unsaturated alkyd resins utilized in the coatings field, produced from any polybasic acid and polyfunctional alcohol. Thus, for example, the alkyd may be made from such polyfunctional acids as phthalic acid, maleic acid, fumaric acid, isophthalic acid, succinic acid, trimellitic acid, adipic acid, azelaic acid, sebacic acid, linoleic acid, fatty acids, and the like, as well as from anhydrides of such acids. The polyfunctional alcohol can be, for example, glycerine, trimethylolethane, trimethylolpropane, pentaerythritol, sorbitol, mannitol, ethylene glycol, diethylene glycol, 2,3-butylene glycol, and similar polyols.

As indicated, the alkyd resin may be oil-modified or non-oil-modified. The oil, when one is utilized, can be a saturated oil, such as coconut oil, or drying or semidrying oils, such as fish oils, linseed oil, soybean oil or the like, can be employed. If desired, the alkyd resin can contain a monobasic acid, such as benzoic acid, a substituted benzoic acid, or a similar monobasic aromatic acid.

Included within the scope of the term "alkyd resin" as used herein are reaction products of polybasic acids and polyfunctional alcohols as disclosed above, which are copolymerized with one or more other polymerizable ethylenically unsaturated monomers. Such monomers include esters of acrylic acid and methacrylic acid, acrylonitrile, olefinic hydrocarbons, hydrocarbons, and other such monomers containing a $CH_2{=}C{<}$ group.

In producing the coating compositions of the invention, the above alkyd-aminoplast compositions are combined with a methylol phenol ether composition consisting essentially of one or more methylol phenol ethers of the formula

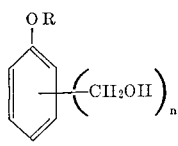

where $n$ is an integer from 1 to 3 and R is an unsaturated aliphatic group or a halogen-substituted unsaturated aliphatic group. The groups represented by R should contain at least 3 carbon atoms and can be, for example, allyl groups (which are preferred) or others such as methallyl, crotyl, or butenyl. The halogen-substituted unsaturated groups represented by R can be various mono- and poly-halogenated derivatives of the above unsaturated aliphatic groups, for example, 2 - chloroallyl, 3-chloroallyl, 3 - chloro-2-methylallyl, 1-chloro-2-butenyl, and corresponding groups containing bromine or fluorine as the halogen.

The methylol phenol ether compositions employed herein are described in U.S. Pat. 2,579,330, and as disclosed herein can be produced from sodium or barium salts of 2,4,6-tris(hydroxy methyl)phenols, which are obtained by reacting formaldehyde with phenol in the presence of sodium or barium hydroxide. Several methylol phenol ether compositions of this type are commercially available and these generally comprise mixtures of allyl ethers of mono-, di- and trimethylol phenols (substituted in the ortho, para and meta compositions). The trimethylolated derivative is generally the predominant component of the composition. Such commercially available methylol phenol ether compositions are preferred for use in the invention.

In formulating the coating composition, the proportions of the methylol phenol ether composition and the alkydaminoplast composition can be varied considerably and the optimum amounts employed depend upon the particular properties desired in the product and also depend in part upon the particular alkyd and aminoplast employed. In most instances, compatibility of the components must be considered although for some purposes some degree of incompatibility can be tolerated. In the preferred products, the methylol ether composition comprises from about 3 to about 15 percent of the methylol phenol ethers and the alkyd and aminoplast, although as little as 1 percent gives some degree of improvement in properties and as much as 30 percent or even higher can be utilized in some cases.

In the ordinary case, the alkyd-aminoplast composition is first produced and then combined with the methylol phenol ether composition. Heating of the mixture can be carried out although it is not usually necessary. When mixed in this manner it is not known with certainty whether any coreaction takes place between these components, but some reaction may take place either prior to or during curing. It is also possible to add the methylol phenol ether composition during the preparation of the alkyd-aminoplast composition or the components thereof, and thereby provide additional opportunity for some degree of interreaction. Also, if desired the alkyd and/or the aminoplast resin can be modified so as to provide reactive sites which can more easily react with the methylol phenol ethers.

In addition to the alkyd-aminoplast composition and the methylol ether composition, the coating compositions herein ordinarily contain several additive components to provide the desired overall combination of properties. Such additive materials can include, for instance, stabilizers, plasticizers, and materials to decrease the required curing temperatures. Various pigments are also usually included to provide colored finishes as desired.

The coating compositions described herein are particularly useful as thermosetting primers for appliances such as laundry equipment, where detergent resistance is an important property. These coating compositions can also be used for topcoats or as one coat finishes, although they have a tendency to yellow somewhat during baking and therefore are less suited for topcoats where a white finish is desired. Used as a primer, however, with virtually any topcoat material, they provide a hitherto unattainable combination of properties. Thus, in addition to outstanding detergent resistance they impart improved adhesion to the substrate, particularly metals, and also improved intercoat adhesion with the topcoat. In addition, they give coatings with excellent salt-spray resistance and other such properties.

The coating compositions herein can be applied by any conventional application method, such as by electrostatic or conventional spraying, roll coating, brushing and the like. Ordinarily, the composition will include one or more solvents, and the choice of solvents and the concentration of the resinous components in the solvent mixture are chosen with reference to the desired manner in which the composition is to be applied. The compositions can be applied to various substrates; while they are most usually employed as coatings on metals such as steel, aluminum, treated steels, copper, etc., they can also be utilized over wood, glass, plastics, and other substrates.

After application, the compositions are dried and cured by baking at elevated temperatures to produce a cured, hard, infusible film. The baking schedules employed also depend upon the nature of the particular composition, the nature of the substrate, and the manner in which it is to be used. The inclusion of an acid or addition of various agents can lower the effective curing temperature. Generally speaking, baking temperatures of at least 350° F. and preferably 400° F. are employed, and the ordinary baking schedule is between 375° F. and 425° F. for 15 to 30 minutes. In some cases, other curing techniques, not requiring such elevated temperatures, can be used.

A typical composition of the invention is described in the following example (all parts and percentages in the example and throughout this specification are by weight and are based upon non-volatile solids content, unless otherwise indicated):

EXAMPLE

In this example, the alkyd-aminoplast composition employed contained an alkyd resin of the following composition:

| | Percent |
|---|---|
| Soya oil | 55.04 |
| Glycerol benzoate | 3.32 |
| Glycerol isophthalate | 40.16 |
| Excess glycerine | 1.48 |

This resin, as a 50 percent solution in mineral spirits, was combined with a benzoguanamine-formaldehyde resin which is substantially completely butylated and which has the following properties:

Solids content (in 1 to 1 xylene-butanol mixture (percent) _____ 60
Acid number (percent) _____ 0–1

| | |
|---|---|
| Specific gravity (percent) | 1.04 |
| Lbs./gal. | 8.7 |
| Viscosity (Gardner-Holdt) | G–K |
| Mineral spirits tolerance (min.) cc./g. | 5 |

The coating composition was produced by mixing 367 parts of the above alkyd resin solution, 125 parts of the above benzoguanamine-formaldehyde resin solution, 7 parts of ethyl ethanolamine (stabilizer) and 111 parts of mineral spirits. This mixture was blended wtih 219 parts of pigment paste containing 36 parts of the alkyd resin solution, 129.4 parts of titanium dioxide, 0.6 part of carbon black, 5 parts of butyl Carbitol and 48 parts of mineral spirits. There were then added slowly 31 parts of a commercially available methylol phenol ether composition known as Methylon 75108. It is essentially a mixture of the allyl ethers of mono- di- and trimethylol phenols, with the trimethylol derivative predominating, and has the following properties:

| | |
|---|---|
| Solid content (percent) | 100 |
| Viscosity (25° C.)—2000–4000 cps. | |
| Pounds per gallon | 10 |
| Percent reactive | 99 |

The resinous vehicle of the coating composition thus obtained contained, based on resin solids, 65.5 percent of alkyd resin, 24.5 percent of benzoguanamine-formaldehyde resin, and 10 percent of methylol phenol ethers.

The coating composition was reduced to a viscosity of 21 seconds (#2 Zahn cup) with high boiling aromatic naphtha (B.P. 187–205° C.) and applied to calcium-zinc phosphate treated steel panels to give a 0.3 mil thick dry film. For comparison, another such panel was coated with a coating composition made in the same manner except that the vehicle contained 75 percent alkyd and 25 percent aminoplast resin, with the methylol phenol ether composition omitted. Both panels were baked at 375° F. for 15 minutes and evaluated by a commercially used detergent resistance test in which the coating is exposed to a 1½ percent detergent solution in distilled water at 165° F. The coating made in accordance with the present invention had only slight blistering after 120 hours and was considered to satisfactorily pass the test for this period, whereas the comparison coating (without the methylol phenol ether composition) failed the test being badly blistered and peeled with loss of adhesion after 96 hours.

Other tests have shown that the advantages of incorporation of methylol phenol ethers in alkyd-aminoplast compositions as described are obtained not only with the compositions specifically exemplified but with other compositions employing, for instance, other methylol phenol ethers of the class disclosed, as well as other alkyd resins and other aminoplast resins. Among the alkyd resins that can be utilized are oil-free resins which are employed as in the above example (with suitable changes in solvents being made as required). An example of such an oil-free alkyd has the following composition:

| | Percent |
|---|---|
| Neopentyl glycol adipate | 10.44 |
| Neopentyl glycol isophthalate | 55.99 |
| Trimethylolpropane adipate | 22.17 |
| Excess trimethylolpropane | 11.40 |

Similarly, other aminoplast resins can be used, including melamine-formaldehyde and urea-formaldehyde resins. Hexakis(methoxymethyl)melamine is one example of such a melamine-formaldehyde resin, as is the butylated resin from the reaction of 6.0 moles of formaldehyde and 4.3 moles of butanol per mole of melamine. A useful urea-formaldehyde resin is produced from 2.2 moles of formaldehyde and 1.6 moles of butanol per mole of urea.

Also, various proportions of the components can be utilized. For example, a coating composition was produced as in the above example except that the vehicle contained 65 percent of the alkyd resin, 30 percent of the benzoguanamine-formaldehyde resin, and 5 percent of the methylol phenol ether composition. When tested as above, some blistering took place in 100 hours but the coating still passed the test for this period.

According to the provision of the patent statutes, there are described above the invention and what are now considered to be its best embodiments. However, within the scope of the appended claims, it is to be understood that the invention can be practiced otherwise than as specifically described.

We claim:
1. A coating composition the resinous vehicle of which consists essentially of
   (1) an alkyd resin-aminoplast resin composition, and
   (2) from about 1 to about 30 percent, based on the total weight of (1) and (2) herein, of a methylol phenol ether composition consisting essentially of one or more methylol phenol ethers of the formula

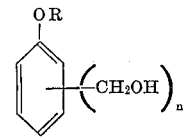

where $n$ is an integer from 1 to 3 and R is an unsaturated aliphatic group or a halogen-substituted unsaturated aliphatic group.

2. The composition of claim 1 in which said alkyd resin is oil-modified.
3. The composition of claim 1 in which said alkyd resin is oil-free.
4. The composition of claim 1 in which said aminoplast resin is a benzoguanamine-formaldehyde resin.
5. The composition of claim 1 in which said alkyd resin-aminoplast resin composition contains from about 5 to about 60 percent by weight of aminoplast resin.
6. The composition of claim 1 in which said methylol phenol ether composition consists essentially of a mixture of allyl ethers of mono-, d-, and tri-methyl phenol.
7. A coating composition in which the resinous vehicle consists essentially of
   (1) an alkyd resin-aminoplast resin composition containing from about 5 to about 60 percent by weight of alkylated condensation product of formaldehyde with melamine, urea or benzoguanamine, and
   (2) from about 3 percent to about 15 percent, based on the total weight of (1) and (2) herein of a methylol phenol ether composition consisting essentially of a mixture of allyl ethers of mono-, di-, and tri-methylol phenol.
8. The composition of claim 7 in which said aminoplast resin is a butylated benzoguanamine-formaldehyde resin.
9. An article having a surface containing an adherent cured layer of the coating composition of claim 1.

References Cited

UNITED STATES PATENTS

| | | | |
|---|---|---|---|
| 2,579,330 | 12/1951 | Martin | 260—613 |
| 2,579,331 | 12/1951 | Martin | 260—52 |
| 2,606,929 | 8/1952 | Martin | 260—613 |
| 2,707,715 | 5/1955 | Martin | 260—613 |
| 3,061,579 | 10/1962 | Mecum et al. | 260—842 |
| 3,108,083 | 10/1963 | Laganis | 260—20 |
| 3,133,032 | 5/1964 | Jen et al. | 260—21 |

FOREIGN PATENTS 1,094,899  12/1960  Germany.

DONALD E. CZAJA, Primary Examiner

R. W. GRIFFIN, Assistant Examiner

U.S. Cl. X.R.

117—132, 161; 204—181; 260—22, 32.6, 33.2, 33.6, 39, 40, 850